No. 889,282. PATENTED JUNE 2, 1908.
E. P. WEBSTER.
DEVICE FOR OPERATING TRANSOMS AND SHUTTERS.
APPLICATION FILED OCT. 4, 1907.
4 SHEETS—SHEET 1.
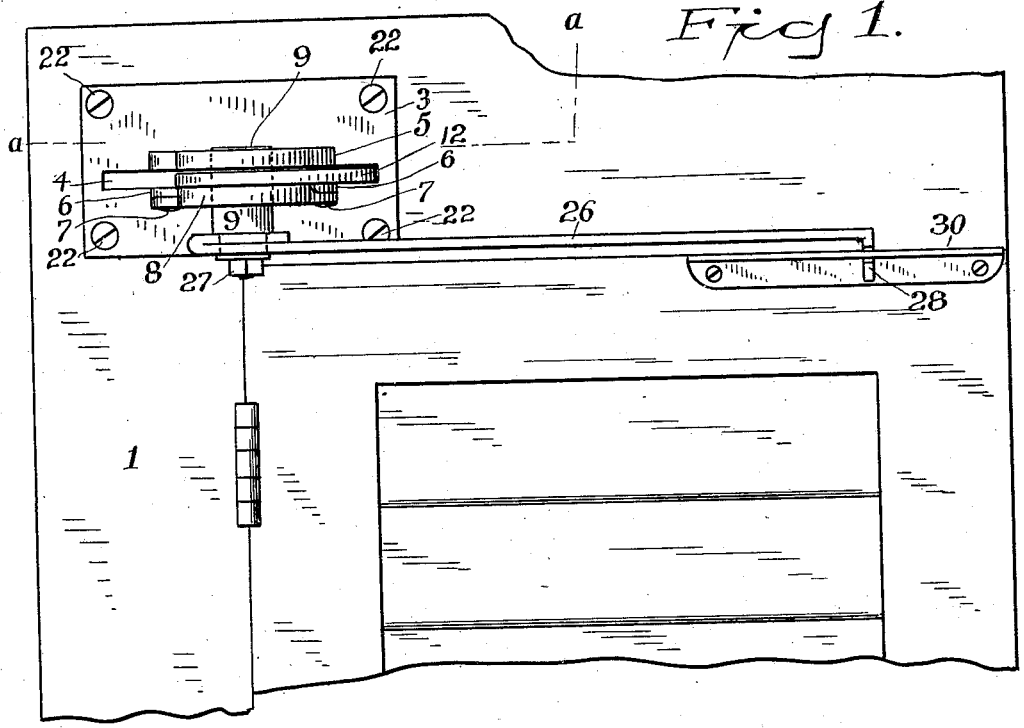
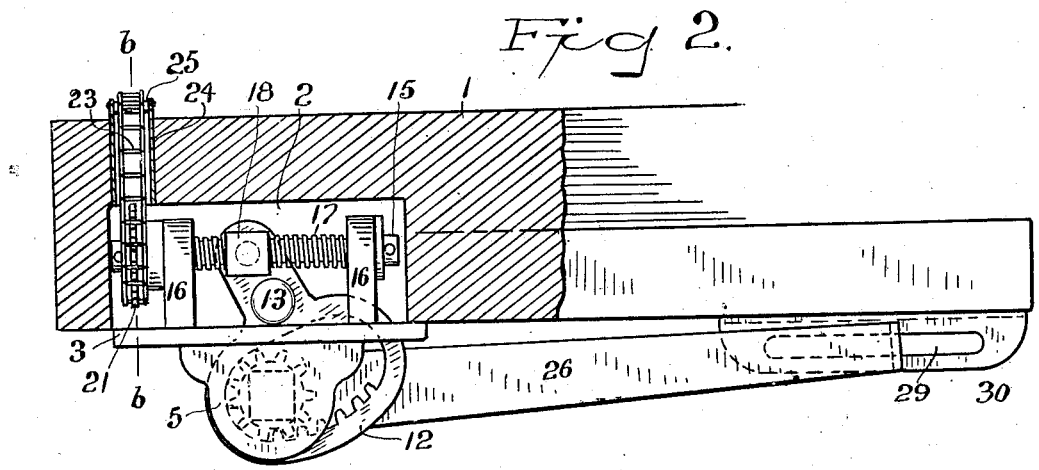

No. 889,282. PATENTED JUNE 2, 1908.
E. P. WEBSTER.
DEVICE FOR OPERATING TRANSOMS AND SHUTTERS.
APPLICATION FILED OCT. 4, 1907.
4 SHEETS—SHEET 2.
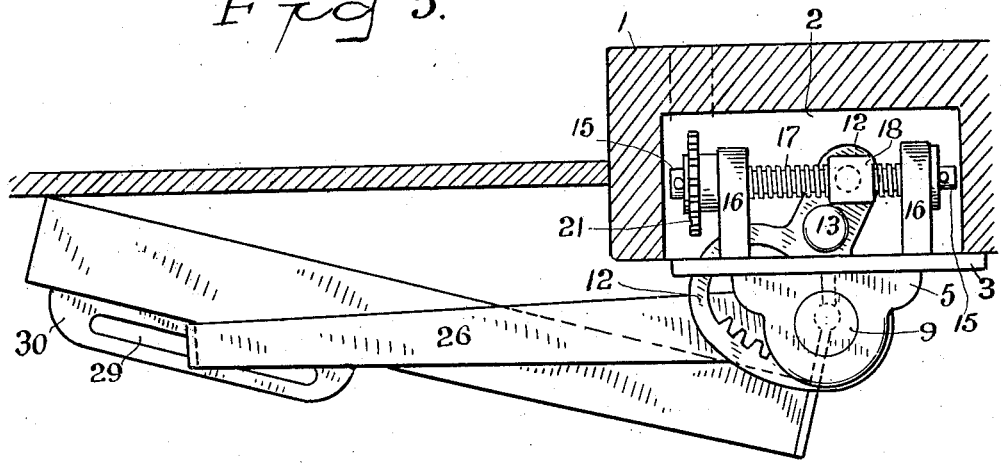
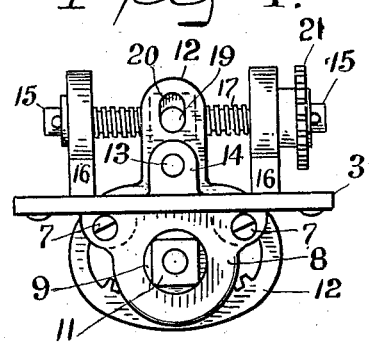 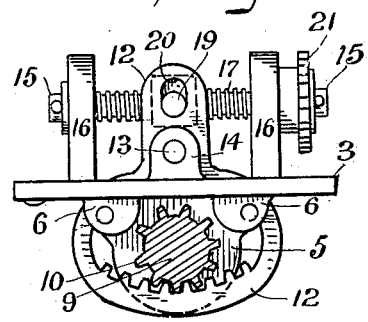
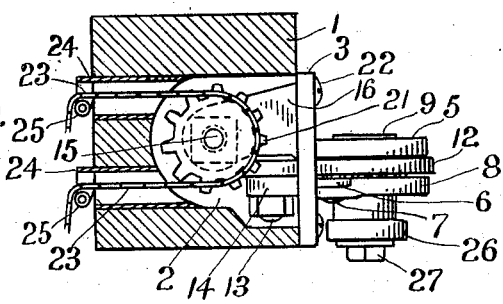
Witnesses:
Inventor
E. P. Webster
By Attorney No. 889,282.
PATENTED JUNE 2, 1908.
E. P. WEBSTER.
DEVICE FOR OPERATING TRANSOMS AND SHUTTERS.
APPLICATION FILED OCT. 4, 1907.
4 SHEETS—SHEET 3.
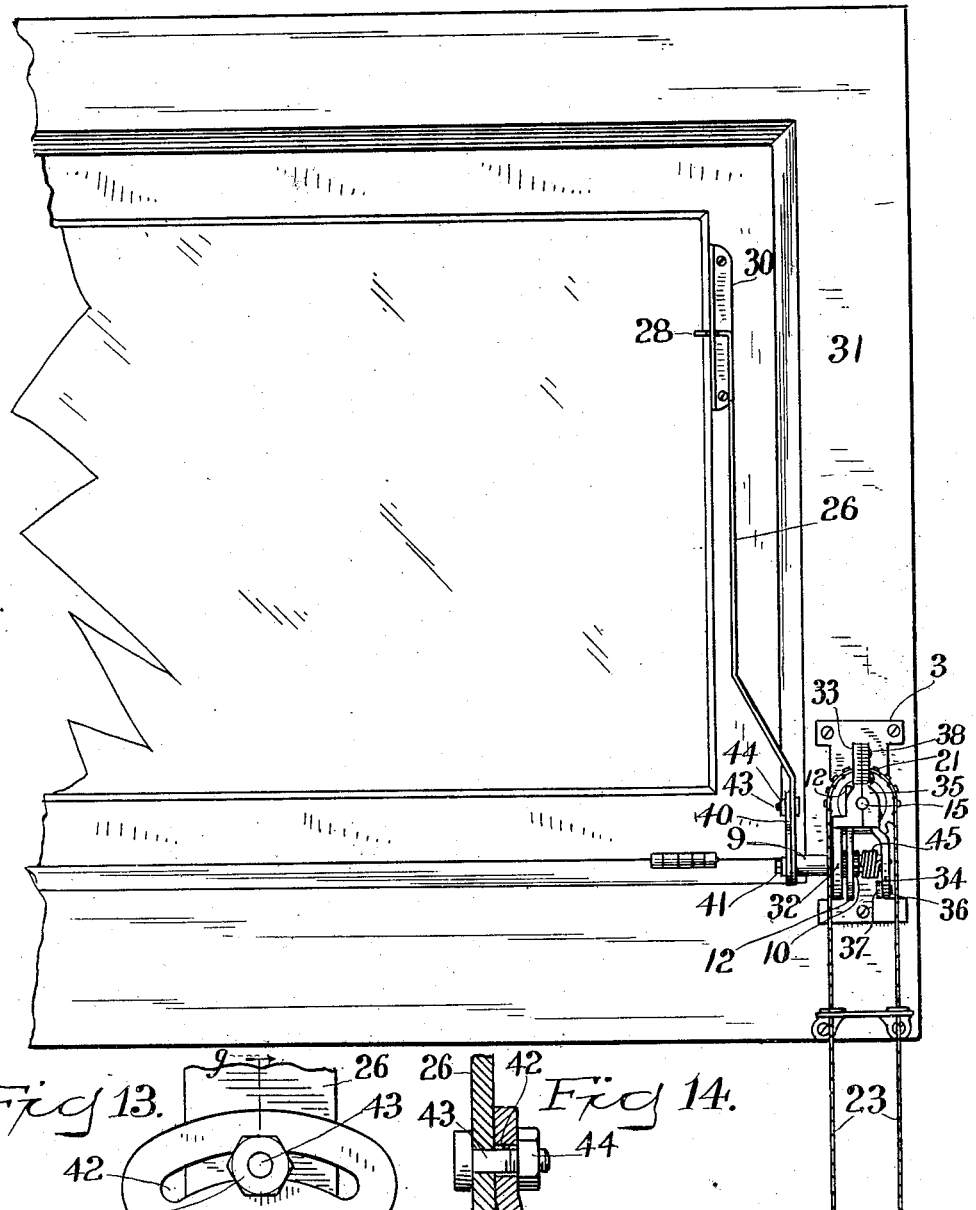
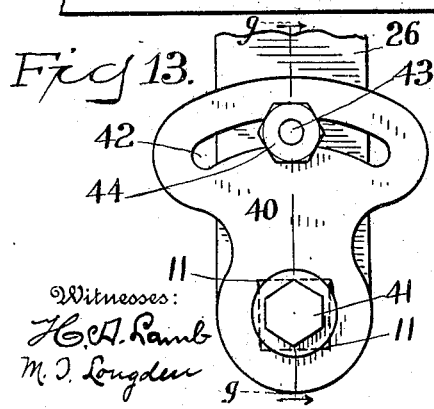
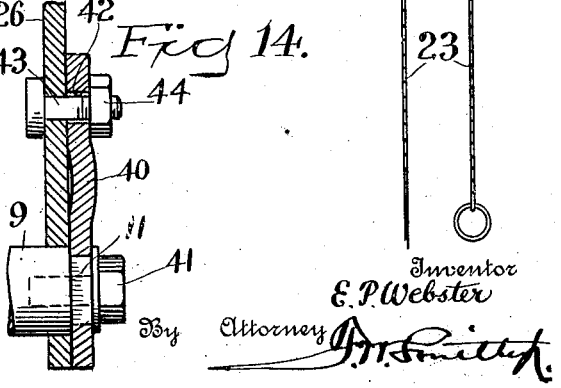

No. 889,282. PATENTED JUNE 2, 1908.
E. P. WEBSTER.
DEVICE FOR OPERATING TRANSOMS AND SHUTTERS.
APPLICATION FILED OCT. 4, 1907.
4 SHEETS—SHEET 4.
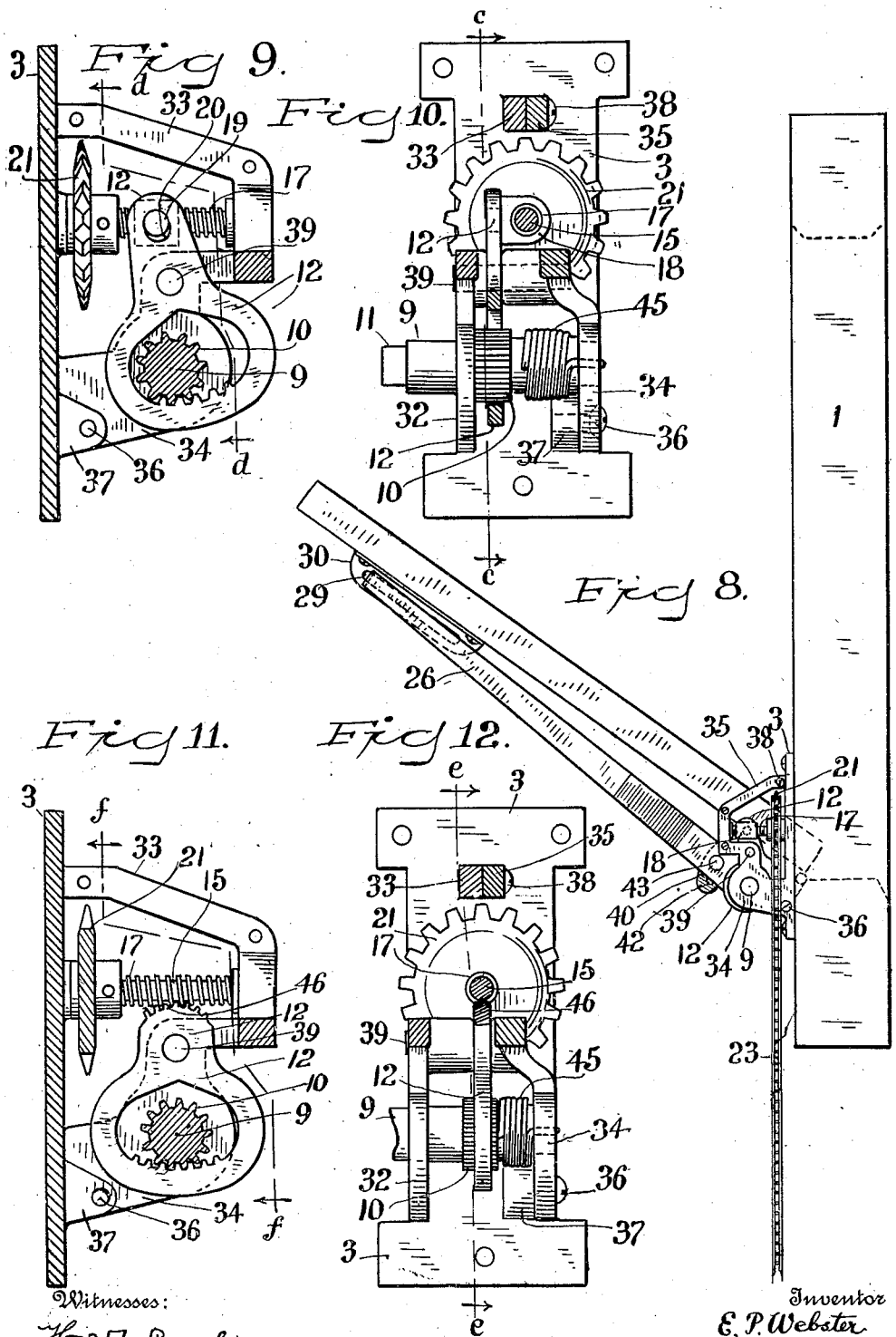

UNITED STATES PATENT OFFICE.

EDGAR P. WEBSTER, OF BRIDGEPORT, CONNECTICUT.

DEVICE FOR OPERATING TRANSOMS AND SHUTTERS.

No. 889,282.  Specification of Letters Patent.  Patented June 2, 1908.

Application filed October 4, 1907. Serial No. 395,919.

*To all whom it may concern:*

Be it known that I, EDGAR P. WEBSTER, a citizen of the United States, residing at Bridgeport, in the county of Fairfield and State of Connecticut, have invented certain new and useful Improvements in Devices for Operating Transoms and Shutters; and I do hereby declare the following to be a full, clear, and exact description of the invention, such as will enable others skilled in the art to which it appertains to make and use the same.

My invention relates to certain improvements in devices for operating transoms and shutters, and consists of certain combinations and arrangements of parts, such as will be hereinafter fully described and then particularly pointed out in the claims which conclude this application.

The object of my invention is to provide a device of this description which shall be readily operated and not likely to get out of order.

In the accompanying drawing which forms a part of this application Figure 1 is an elevation of the outside of a shutter as it appears when equipped with my improvement—Fig. 2 a section at the line *a, a,* of Fig. 1, the position of the shutter being shown as closed—Fig. 3 a view similar to Fig. 2, but showing the position of the parts when the shutter is open—Fig. 4 a detail elevation of my improvement with the shutter operating lever removed—Fig. 5 a view similar to Fig. 4 but with one of the cheek plates removed and showing the pinion in section—Fig. 6 a section at the line *b, b,* of Fig. 2—Fig. 7 a front elevation showing my improvement as it appears when applied in position to operate a transom, the latter being shown in closed position—Fig. 8 a side elevation of the construction and arrangement shown at Fig. 7, the transom being shown open—Fig. 9 a detail elevation partly in section of this transom operating device, taken at the line *c, c,* of Fig. 10—Fig. 10 a section taken at the line *d, d,* of Fig. 9—Fig. 11 a view similar to Fig. 9 but showing a modification of my improvement, this view being taken at the line *e, e,* of Fig. 12—Fig. 12 a section taken at the line *f, f,* of Fig. 11—Fig. 13 a detail elevation showing the manner in which the operating lever is preferably secured, and Fig. 14 a section at the line *g, g,* of Fig. 13.

Similar numbers of reference denote like parts in the several figures of the drawing.

My improvement is adapted for use for the purposes of operating either a transom or a shutter and in order to give a clear understanding of my invention I have illustrated the same in connection with both a shutter and a transom, but the mechanical operation of the parts is the same in both instances, and I will therefore confine my description as to details mainly to the operation of my device in connection with a shutter, it being of course understood that I do not thereby limit the field of operation of my improvement.

The following description in detail refers to Figs. 1 to 6 inclusive, which description, together with the numerals of reference employed will apply without repetition to Figs. 7 to 14 inclusive.

1 is an ordinary window casing which is mortised at 2 on the outside for the purposes presently to be explained.

My improved device comprises a face plate 3 which has an elongated slot 4, on one side of which is a cheek plate 5 preferably cast integral with the front of the plate 3 while on the other side of said slot and preferably cast integral with the front of the plate 3 are lugs 6 to which are secured by means of screws 7 a cheek plate 8 which latter is opposite to the plate 5 and is made detachable merely for the purposes of convenient assembly of the parts. Journaled within these cheek plates is a short shaft 9, and carried by this shaft between the cheek plates and preferably integral with said shaft is a pinion 10, the lower extremity of said shaft being squared as shown at 11, for the purposes presently to be explained.

12 is a segment gear lever which is pivoted at 13 to a lug 14 which extends from the rear of the plate 3, the teeth of this gear being in mesh with the pinion 10.

15 is a shaft journaled within brackets 16 cast integral with the rear face of the plate 3, this shaft being screw threaded as seen at 17.

18 is a nut engaging said shaft and having a small post 19 projecting therefrom with which post the rear end of the lever 12 is loosely connected, by means of an elongated opening 20 in said lever.

21 is a sprocket wheel which is secured to one end of the shaft 15, which latter is incapable of lengthwise movement, so that it will be readily understood that when said shaft is revolved the nut 18 will be caused to travel thereby swinging the lever 12 on its pivotal point and effecting the revolution of the pinion 10.

My improved device is placed within the mortise 2 and secured by means of screws 22, and a suitable chain 23 is passed around the sprocket 21, the ends of this chain being led out through metal thimbles 24 and over friction rollers 25 and thence allowed to depend within convenient access.

26 is a long lever one end of which is secured around the square end 11 of the shaft 9 outside the window casing, and held in this position by means of a nut 27, while the other end of said lever is equipped with an angularly disposed hook 28 which passes through an elongated slot 29 in a plate 30 that is secured to the outer portion of the shutter, the connection between this hook and slot being such that the former may readily travel throughout the latter.

The operation of my improvement is as follows:—The two ends of the chain 23 are properly marked or otherwise identified so that the operator will readily know which chain must be pulled in order to open or close the shutter, as the occasion may demand. The blind being in closed condition a pull upon the proper chain will cause the sprocket to revolve thereby effecting the turning of the pinion whereby the long lever 26 will swing outwardly to open the shutter, this pulling of the chain being continued until the shutter has been swung completely back, as shown at Fig. 3. Pulling on the other chain will of course effect the closing of the shutter. The proper chain may be pulled to leave the shutter open to any desired degree, and the latter will stay in this position because any force brought to bear upon the shutter itself to operate the same will be resisted by the end thrust of the nut 18 against the screw thread 17.

In applying my improvement for the purposes of operating a transom, the face plate 3 is secured directly to the transom casing 31 without any mortising, and all the operative parts are on one side only of said plate, this being necessary owing to the fact that the transom is operated in a vertical plane while the operation of the shutter is in a horizontal plane.

Referring to Figs. 7 to 14 inclusive, which relate to the application of my improvement in connection with a transom, I will point out the differences as to minor details.

Extending from the face plate 3 and integral therewith is the cheek plate 32 and skeleton frame 33, while a cheek plate 34 and skeleton frame 35 likewise extend from said plate 3 but are detachable therefrom for the purpose of convenient assembly of parts, this detachable cheek plate being secured at one end by a screw 36 to a lug 37 extending from the plate 3, while the end of the skeleton frame 35 is secured at its base by means of a screw 38 directly to the base of the frame 33.

The short shaft 9 carrying the pinion 10 is journaled between the plates 32, 34, and the segment gear lever 12 meshes with this pinion and is pivoted at 39 between the plates 32, 34, and is loosely engaged at its rear end with the post 19 projecting from the nut 18 which latter engages the screw threads 17 on the shaft 15, on which latter the sprocket wheel 21 is secured, all in the manner and for the purpose hereinbefore explained with reference to the adaptation of my improvement for the purpose of operating the shutter.

The shaft 15 is journaled within the plate 3 and the top of the frames 33, 35, and the revolution of the sprocket wheel will cause the nut 18 to travel, thereby swinging the segment gear lever and operating the pinion, all in the manner as heretofore explained.

The location of my device, when the same is applied for the operation of a transom, renders it advisable to provide for an adjustment of the normal position of the long lever 26, since the casing of the transom sometimes extends considerably beyond the vertical plane of the closed transom, and said lever must reach inwardly far enough so as to completely close the transom. I therefore, in this instance, arrange the lever on the rounded portion of the short shaft 9 so that said lever will swing freely around said shaft, and on the squared portion 11 of the shaft I secure a plate 40 by means of a nut 41, which plate near its outer edge is provided with an arcuate slot 24 through which a threaded bolt 43 carried by the lever extends freely, a nut 44 driven against said plate 40 serving to lock the lever and plate together in any desired adjustment.

The weight of a transom is frequently very great, and in order to prevent a shock when the transom is dropped, I provide a coil spring 45 around the short shaft, one end of which spring is secured within the shaft itself while the other end is connected with one of the cheek plates, so that when the transom is lowered the spring will wind and therefore allow the transom to be dropped easily, while the unwinding of the spring, as the transom is raised, will materially assist in the operation of closing the transom.

Instead of imparting movements to the segment gear lever from the screw thread 17, through the medium of the nut 18, said nut may be dispensed with, and the rear end of said lever formed into a worm wheel segment 46 which latter will engage directly with the threads 17, as shown in the modification at Figs. 11 and 12, and I therefore do not wish to be limited in this respect.

The object of the sprocket wheel and the chain is of course to provide a convenient way of revolving the threaded shaft 15 in reverse directions, so as to open and close the transom or shutter, but any suitable and ordinary means may be employed for this purpose, as for instance, a chain secured to the shaft and then wound around the same so that the pulling of one end of the chain would revolve the shaft in one direction and wind up the other end of the chain, while the reverse would be true when the latter end was pulled, and I therefore do not wish to be limited in this respect.

Having thus described my invention what I claim as new and desire to secure by Letters Patent is:—

1. In a device of the character described, the combination of a face plate provided with cheek plates, a short shaft carrying a pinion and journaled within said cheek plates, a pivoted segment gear lever meshing with said pinion, a threaded shaft journaled between supports carried by said plate, a sprocket wheel carried by said shaft, a chain around said sprocket and having its ends depending within convenient access, connections between the rear end of said segment gear lever and said threaded shaft, whereby the latter will communicate swinging movements to said lever, and a long operating lever carried by said short shaft and suitably connected with the shutter or transom to be operated.

2. In a device of the character described, the combination of a base plate carrying cheek pieces, the short shaft carrying a pinion and journaled within said cheek pieces, the segment gear lever meshing with said pinion and pivoted to a part rigid with the face plate, the threaded shaft journaled within supports carried by said plate, the nut around said shaft and loosely connected with the rear end of said segment gear lever, the sprocket carried by said threaded shaft, the chain around said sprocket and having its ends depending within convenient access, and the long operating lever carried by said short shaft.

3. In a device of the character described, the combination of the face plate carrying cheek plates, the short shaft carrying a pinion and journaled within said cheek plates, the pivoted segment gear lever meshing with said pinion, the threaded shaft journaled between supports carried by said face plate, connections between said threaded shaft and said segment gear lever whereby movements are imparted to the latter from the former, the long operating lever carried by said short shaft, and means for revolving said threaded shaft in reverse directions.

4. The combination of a rotary shaft carrying a pinion, means for connecting said shaft with a transom or shutter whereby the latter will be operated by the rotary movements of the shaft, a pivoted lever carrying a segment gear in mesh with said pinion, a threaded shaft stationary as to lengthwise movement, a nut on said threaded shaft and loosely connected with said lever whereby the travel of the nut will cause said lever to swing around its pivotal point, and means convenient of access and connected with said threaded shaft for revolving the same.

5. In a device of the character described, the combination of a rotary shaft carrying a pinion, means for connecting said shaft with a transom or shutter whereby the latter will be operated by the rotary movements of the shaft, a reciprocatory lever carrying a gear in mesh with said pinion, a rotary threaded shaft, connections between said lever and threaded shaft whereby the latter will communicate reciprocatory movements to said lever, and means for revolving said threaded shaft in reverse directions.

In testimony whereof I affix my signature in presence of two witnesses.

EDGAR P. WEBSTER.

Witnesses:
M. T. LONGDEN,
F. W. SMITH, Jr.